(12) United States Patent
Ma et al.

(10) Patent No.: US 6,593,672 B2
(45) Date of Patent: Jul. 15, 2003

(54) MEMS-SWITCHED STEPPED VARIABLE CAPACITOR AND METHOD OF MAKING SAME

(75) Inventors: Qing Ma, San Jose, CA (US); Peng Cheng, Campbell, CA (US); Valluri Rao, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 09/746,718

(22) Filed: Dec. 22, 2000

(65) Prior Publication Data

US 2002/0079743 A1 Jun. 27, 2002

(51) Int. Cl.[7] .................................................. H02M 3/06
(52) U.S. Cl. ......................... 307/109; 307/85; 307/86; 307/99; 307/106; 361/233; 361/277
(58) Field of Search ................. 307/109, 106, 307/85, 86, 99; 361/233, 277, 278

(56) References Cited

U.S. PATENT DOCUMENTS 5,880,921 A * 3/1999 Tham et al. ................. 361/233
6,034,414 A   3/2000 Lin
6,049,702 A   4/2000 Tham et al.
6,150,901 A   11/2000 Auken
6,418,006 B1 * 7/2002 Liu et al. .................... 361/277

OTHER PUBLICATIONS

PCT Notification of Transmittal of The International Search Report or The Declaration for PCT Counterpart Application No. PCT/US01/44454 Containing International Search Report (Dec. 11, 2002).

* cited by examiner

Primary Examiner—Brian Sircus
Assistant Examiner—Robert L. DeBeradinis
(74) Attorney, Agent, or Firm—Blakelyl, Sokoloff, Taylor & Zafman LLP

(57) ABSTRACT

The present invention relates to a stepped micro electromechanical structure (MEMS) capacitor that is actuated by a plurality of MEMS switches. The MEMS switches may be within the stepped capacitor circuit, or they may be actuated by an independent circuit. The stepped capacitor may also be varied with intermediate steps of capacitance by providing at least one variable capacitor in the stepped MEMS capacitor structure.

32 Claims, 15 Drawing Sheets

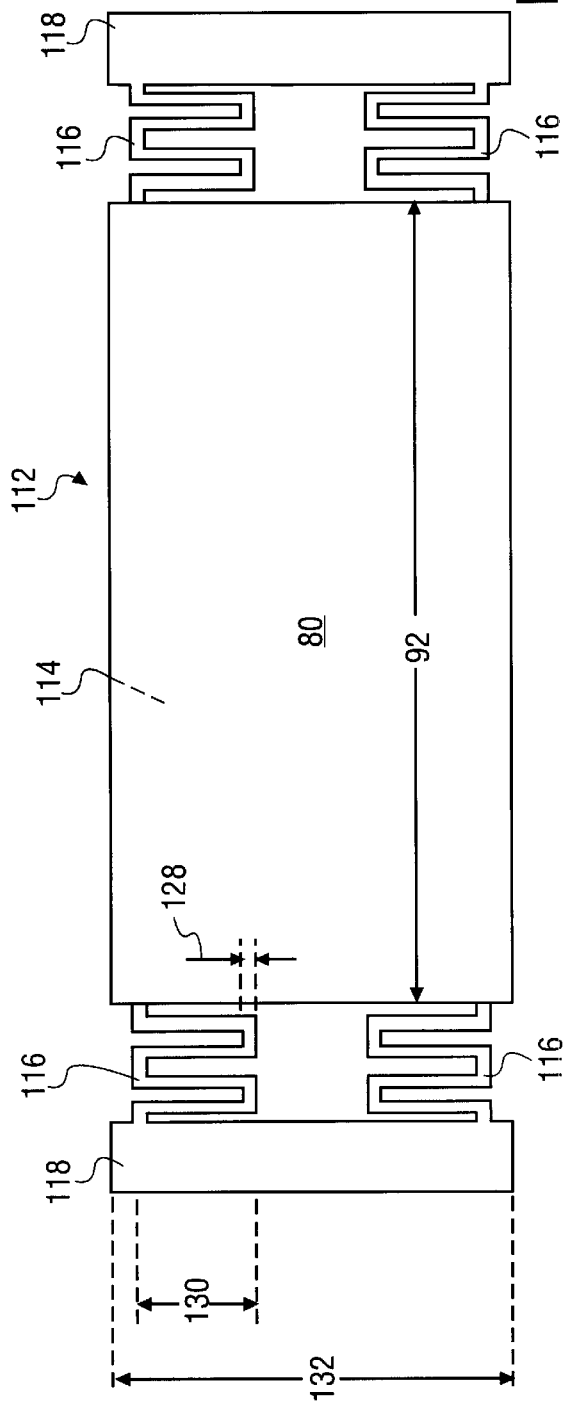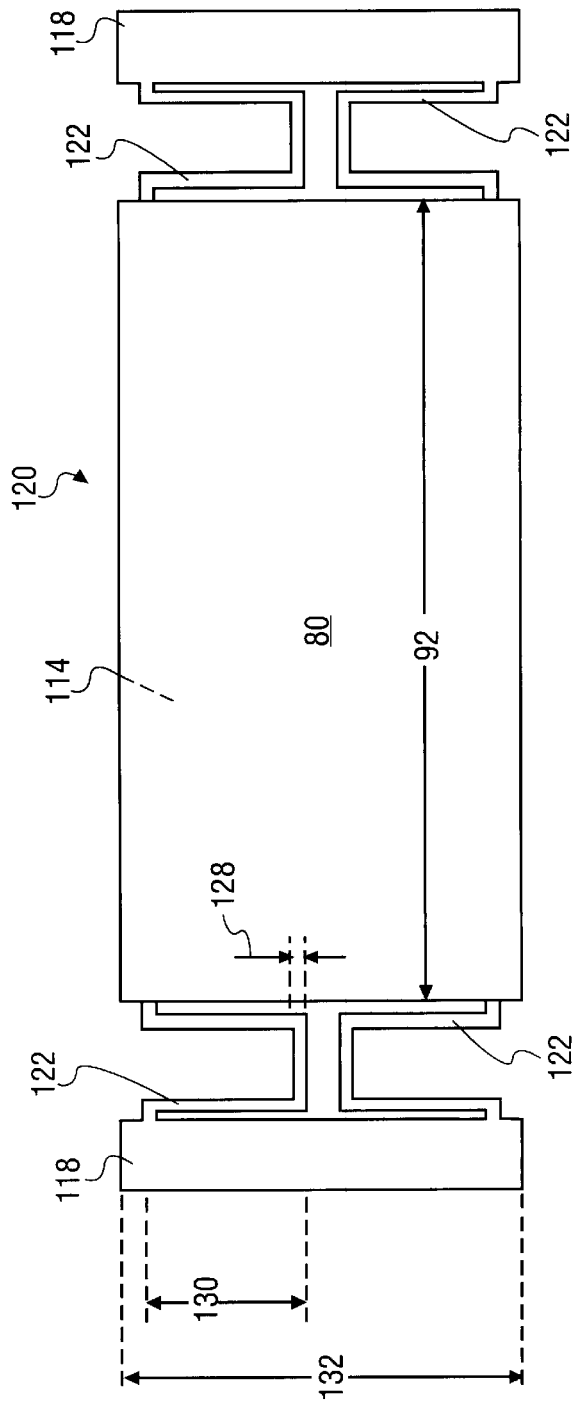

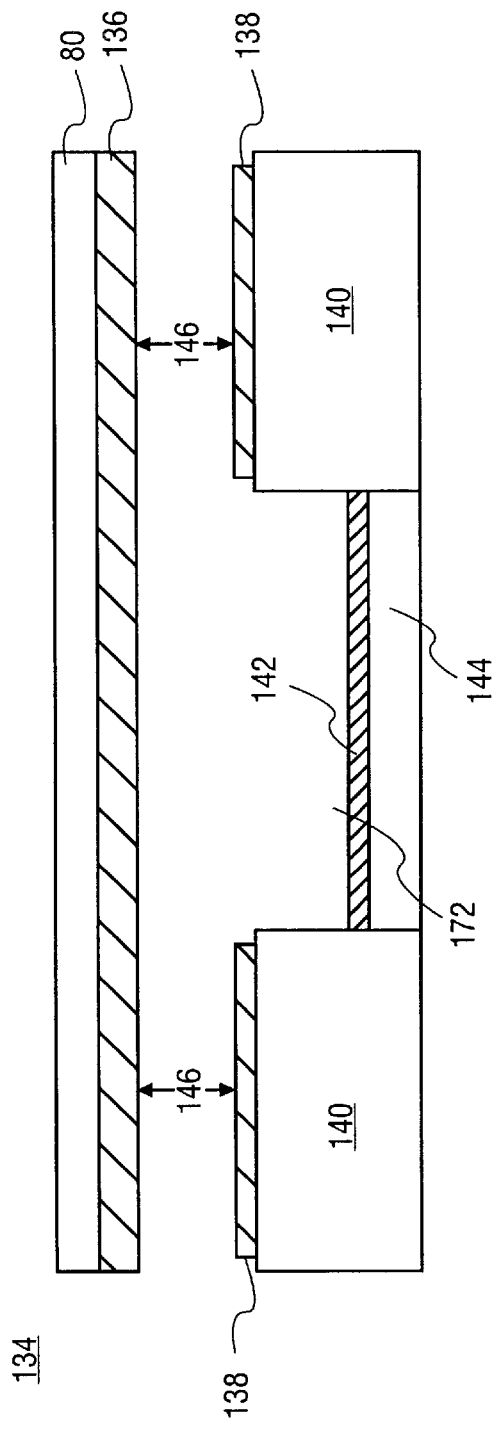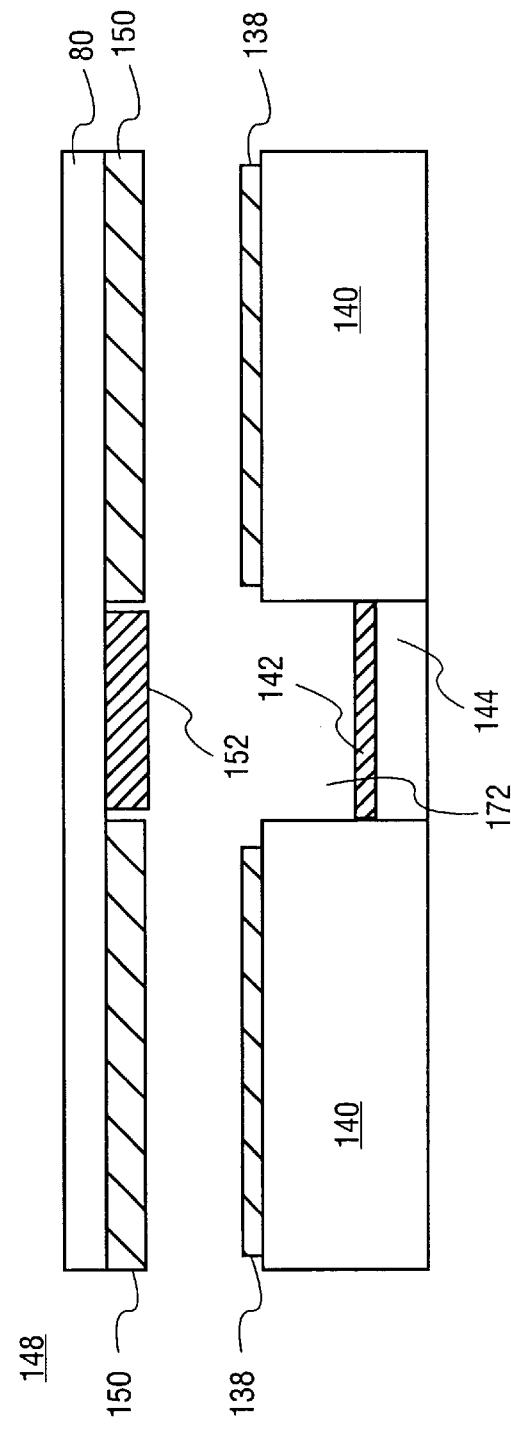

US 6,593,672 B2

MEMS-SWITCHED STEPPED VARIABLE CAPACITOR AND METHOD OF MAKING SAME

BACKGROUND OF THE INVENTION

1. Field of the Invention

The present invention relates generally to a mechanically switched capacitor. More particularly, the present invention relates to a capacitor that may be stepped by mechanically switching on and off additional portions of the capacitor. Additionally, the stepped capacitor may be mechanically variable.

2. Description of Related Art

One of the difficulties of integrated circuit packaging is that selected large, usually passive devices that may be placed on silicon with an integrated circuit (IC), have structures that are not compatible with integrated fabrication of the traditional active components such as field effect transistors. Some components may be placed off chip, but their flexibility may be limited. For example, prior art on-chip variable capacitors are based on varactor diode technology that have a tuning range of less than about 25%. Further the increasing complexity of microelectronic devices such as computers and hand-held devices, has given rise to an increased need for wider ranges of operability in passive devices. One example is a varactor that may be used as a component in a computer or in a hand-held device.

FIG. 1 is a schematic view of a circuit 10 that illustrates basic components. Included therein is a capacitor 12. Capacitor 12 may be a variable capacitor, also known as a varactor. The prior art varactor diode technology has a low pull-in effect. Additionally, prior art membrane capacitors have a capacitance tunable range that is limited due to the voltage exceeding the critical voltage (Vc) thereof. At Vc, the membrane collapses and the capacitor shorts out. Additionally, due to the suspension nature of the prior art capacitors, the center portion of the flexible membrane draws closer to the fixed electrode than the edge portions. This phenomenon creates a greater local capacitance at the center of the flexible membrane than at the edge portions of the flexible membrane where it is anchored.

Additionally, from a production standpoint a wide range of capacitances has not been built into a single capacitor such that one capacitor may fit several applications.

BRIEF DESCRIPTION OF THE DRAWINGS

In order that the manner in which the above-recited and other advantages of the invention are obtained, a more particular description of the invention briefly described above will be rendered by reference to specific embodiments thereof which are illustrated in the appended drawings. In the drawings, like structures will be provided with like reference designations. In order to show the structures of the present invention most clearly, the drawings included herein are diagrammatic representations of integrated circuit structures. Thus, the actual appearance of the fabricated structures, for example in a photomicrograph, may appear different while still incorporating the essential structures of the present invention. Moreover, the drawings show only the structures necessary to understand the present invention. Additional structures known in the art have not been included to maintain the clarity of the drawings. Understanding that these drawings depict only typical embodiments of the invention that are not necessarily drawn to scale and are not therefore to be considered to be limiting of its scope, the invention will be described and explained with additional specificity and detail through the use of the accompanying drawings in which:

FIG. 13 is a top view of an alternative embodiment of the variable capacitor depicted in FIG. 9;

FIG. 14 is a top view of an alternative embodiment of the variable capacitor depicted in FIG. 9;

FIG. 16 is an elevational cross-section view of another embodiment of the variable capacitor;

FIG. 17 is an elevational cross-section view of an alternative embodiment of the variable capacitor depicted in FIG. 16;

DETAILED DESCRIPTION OF THE INVENTION

The present invention relates to a micro electromechanical structure (MEMS) stepped capacitor that may also be variable between stepped capacitances.

Figure 2A:
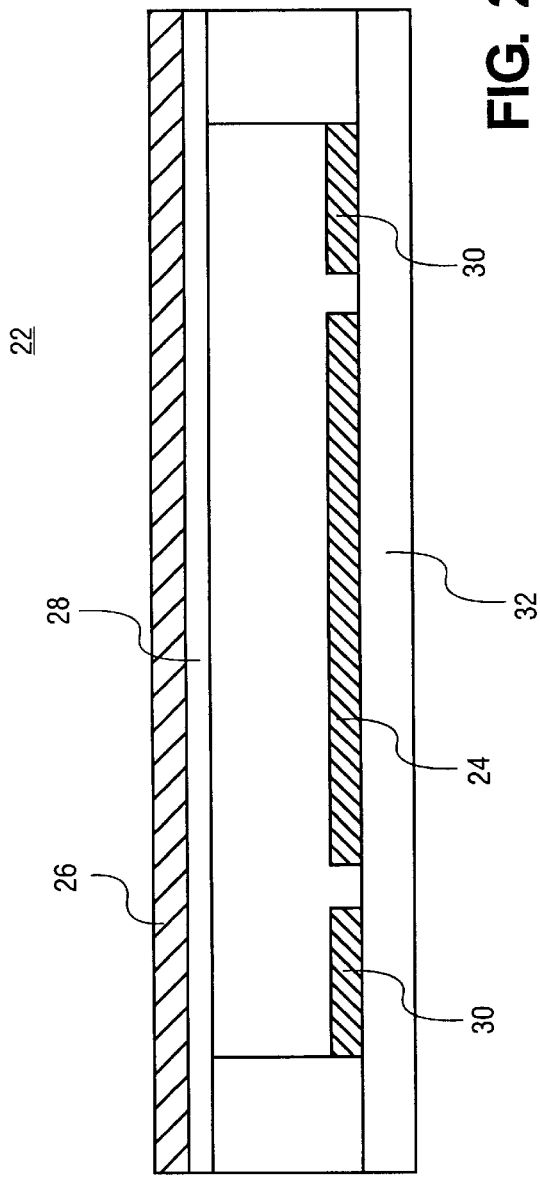
FIG. 2a is an elevational cross section view of MEMS capacitor according to one embodiment of the invention.

FIG. 2a illustrates one embodiment of the invention wherein a MEMS capacitor 22 includes a fixed charge plate 24, a movable charge plate 26, and a dielectric layer 28 that prevents shorting therebetween. Additionally, MEMS capacitor 22 includes actuation plates 30 that use a DC potential to pull movable charge plate 26 toward fixed charge plate 24 in order to vary capacitance therewithin. Typically, fixed charge plate 24 and actuation plates 30 are disposed upon a substrate 32. MEMS capacitor 22 may be referred to as a first capacitor type. Other embodiments of variable capacitors are set forth below.

Figure 2B:
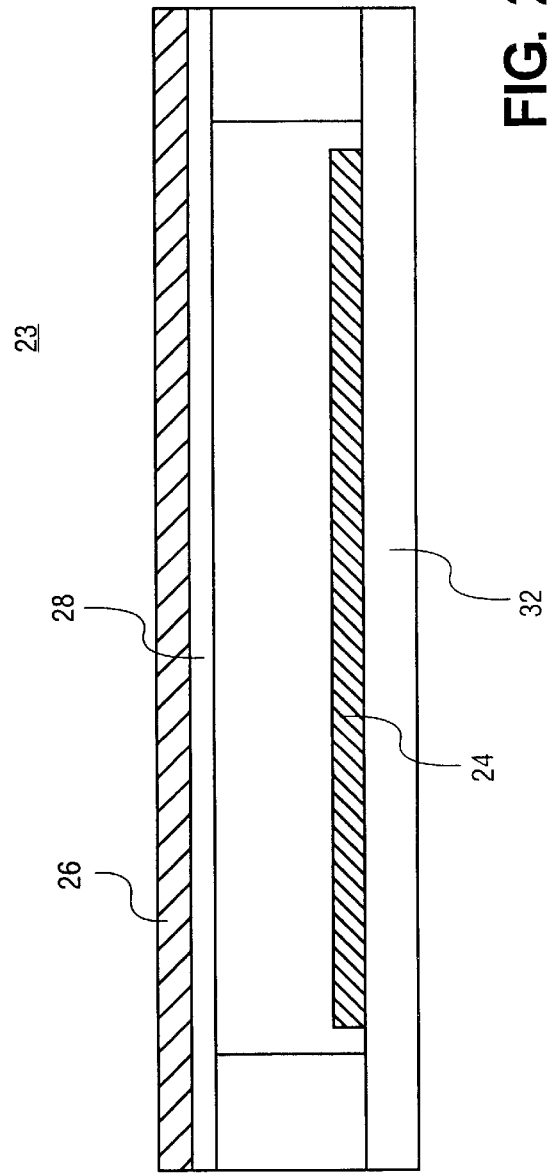
FIG. 2b is an elevational cross section view of MEMS capacitor according to one embodiment of the invention.

FIG. 2b illustrates a second embodiment of the invention wherein a MEMS capacitor 23 includes a fixed charge plate 24, a movable charge plate 26, and a dielectric layer 28 that prevents shorting therebetween. MEMS capacitor 23 does not include actuation plates 30 such as that used in the first capacitor type. Thus, at a certain DC actuation voltage, movable charge plate 26 will collapse and dielectric layer 28 will approach and/or touch fixed charge plate 24. MEMS capacitor 23 may be referred to as a second capacitor type. Other embodiments of variable capacitors are set forth below.

Figure 3A:
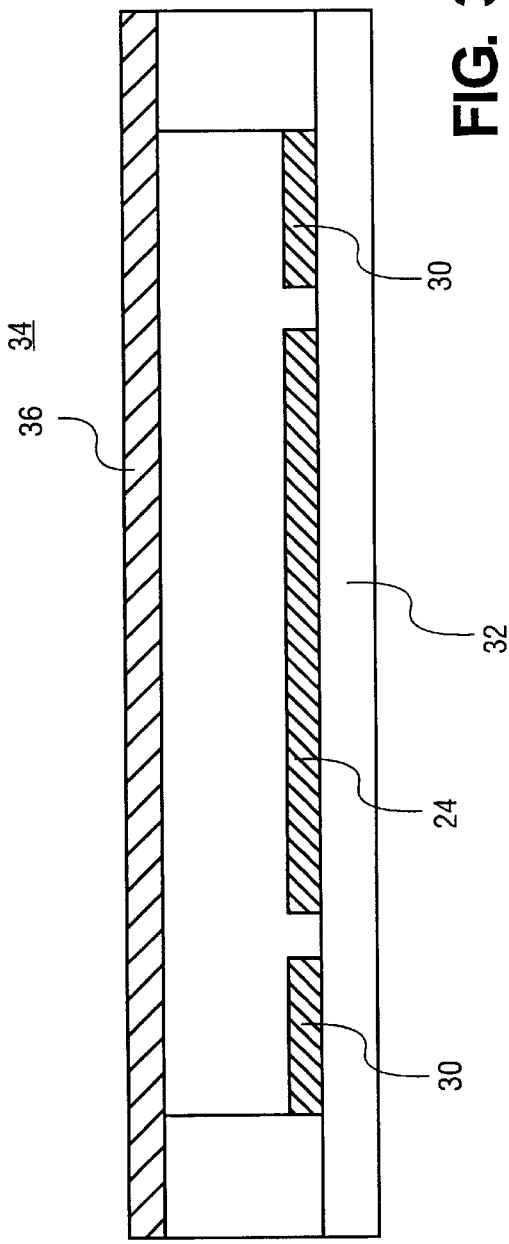
FIG. 3a is an elevational cross section view of a MEMS switch according to the present invention.

FIG. 3a illustrates one embodiment of the invention wherein a MEMS switch 34 includes a fixed charge plate 24, a flexible switch plate 36. Additionally, MEMS switch 34 includes actuation plates 30 that use a DC potential to pull flexible switch plate 36 toward fixed charge plate 24 in order to close the switch. Typically, fixed charge plate 24 and actuation plates 30 are disposed upon a substrate 32.

Figure 3B:
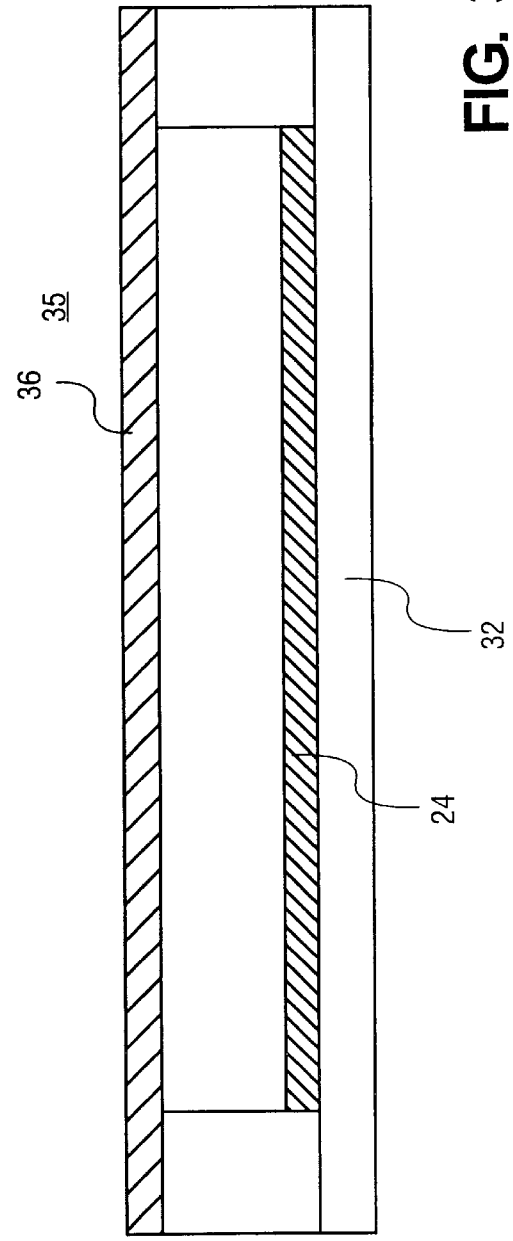
FIG. 3b is an elevational cross section view of a MEMS switch according to the present invention.

FIG. 3b illustrates another embodiment of a MEMS switch 35 that may be used. It can be seen that the MEMS switch 35 may be a parallel plate switch with a structure similar to MEMS capacitor 22 depicted in FIG. 2b. A substrate 32 supports a fixed charge plate 24. Above fixed charge plate 24 is a flexible switch plate 36 that may be pulled toward fixed charge plate 24 to close MEMS switch 34.

Figure 1:
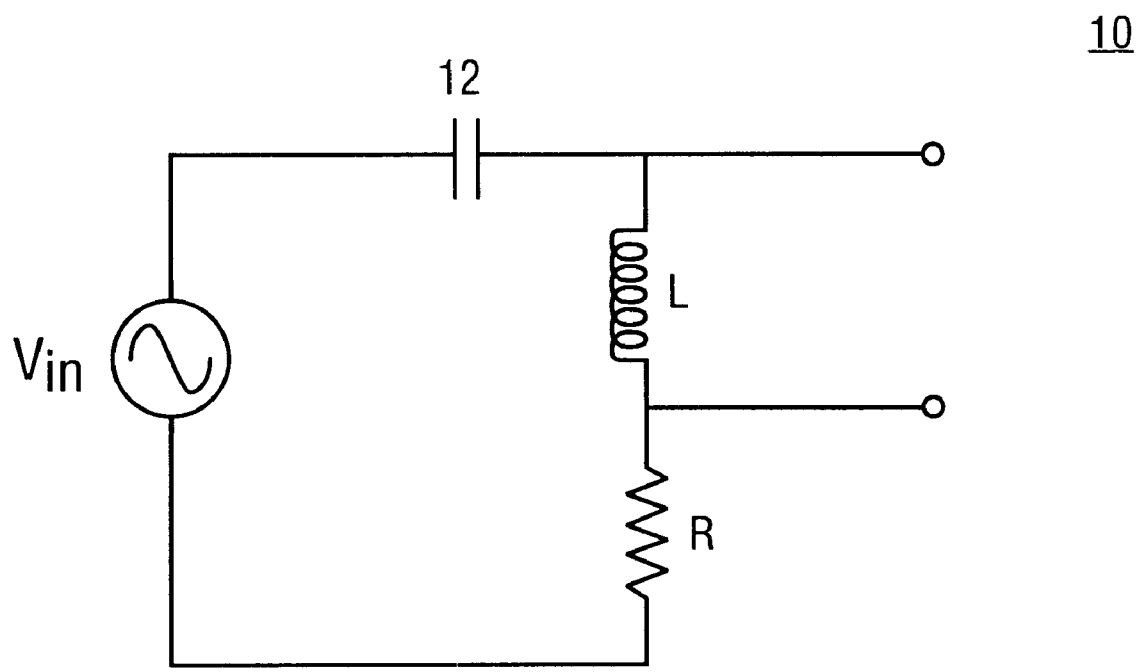
FIG. 1 is a schematic view of a circuit that illustrates basic components.
Figure 4:
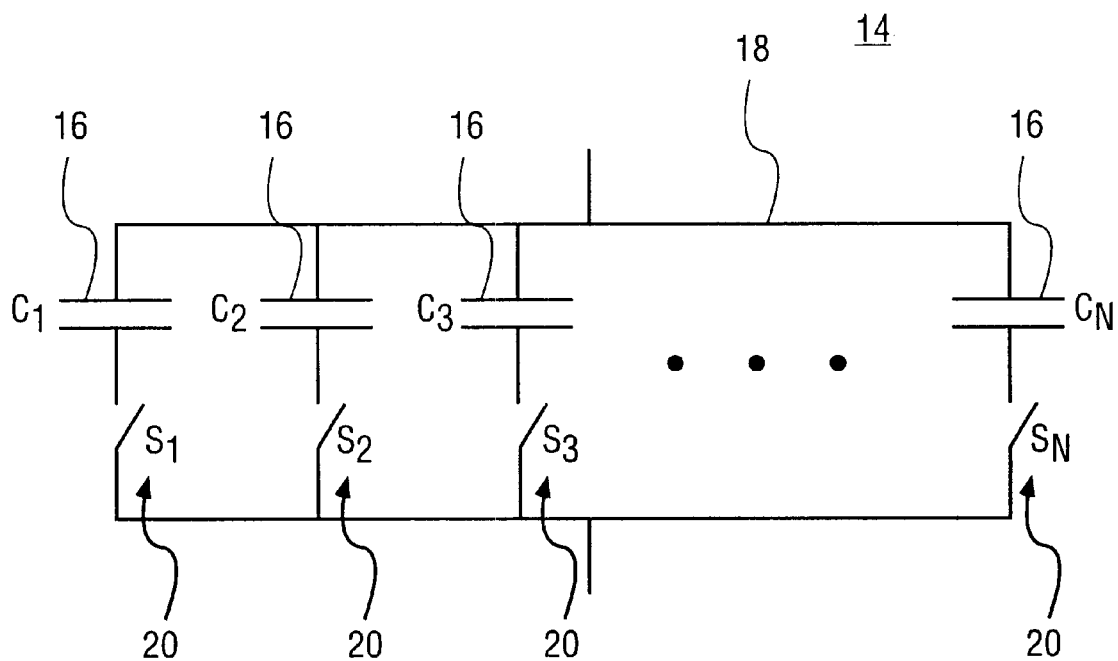
FIG. 4 is a schematic view of a circuit segment that illustrates an inventive stepped capacitor.

FIG. 4 illustrates what may used in the place of capacitor 12 as it appears in circuit 10 of FIG. 1. A stepped capacitor 14 is depicted that includes a plurality of capacitors 16 arrayed in parallel in a first circuit 18. Additionally, a plurality of switches 20 are aligned in series with capacitors 16. In one embodiment, there may be a circuit with n MEMS capacitors and m switches, wherein m<n. For example, where n=2, m may be equal to 1. Hence the circuit would have two capacitors and only one switch, and the switch would be aligned with only one of the two MEMS capacitors. Preferably, the plurality of switches includes at least one MEMS switch as set forth herein.

In order to achieve a stepped capacitance, the surface area of the MEMS switches may be graduated such that a first switch that is in series with a first MEMS capacitor has a first voltage closure threshold and a second switch that is in series with a second MEMS capacitor has a second voltage closure threshold that is higher that the first voltage closure threshold. The scheme may be continued such that a linearly stepped degree of capacitance is proportional to the voltage that is impressed across first circuit 18. For example, if the plurality of switches is MEMS switches 34, a nominal voltage increase of 1 unit of voltage to 2 units of voltage will give rise to a capacitance increase from 1 unit of capacitance to 2 units of capacitance by causing one more switch to close.

Figure 5:
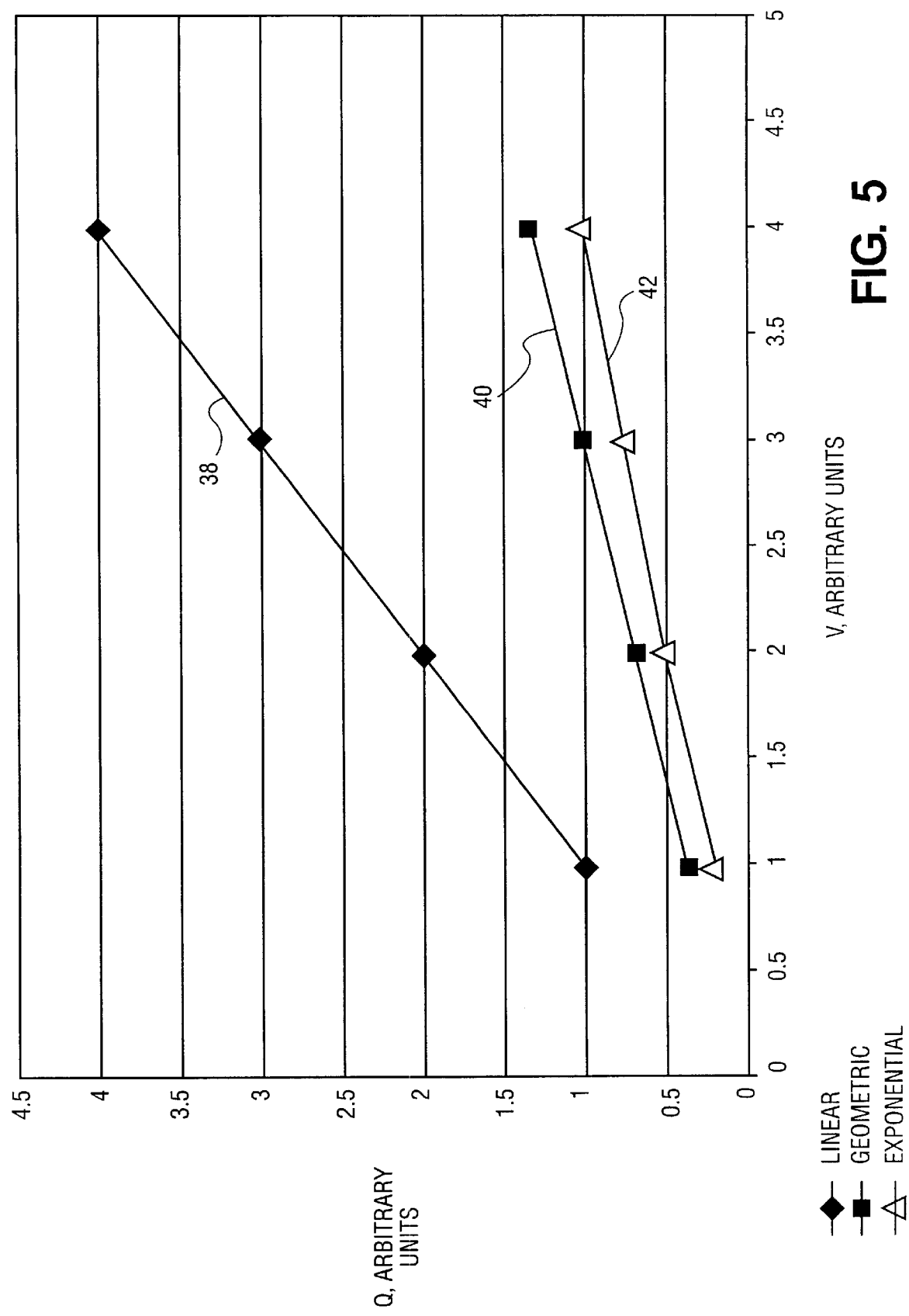
FIG. 5 is a plot of stepped capacitance as a function of the voltage across the switch circuit.

A plot of capacitance increase as a function of nominal stepped voltage increase according to this embodiment will have a positive slope as depicted in FIG. 5. Accordingly, a linear capacitance response 38 to increasing voltage scheme may be achieved wherein the relative surfaces areas in the MEMS switches vary linearly.

Another embodiment of the present invention comprises MEMS switches that have a geometrically increasing surface area such as 1, 2, 4, 8, etc. Accordingly, a capacitance increase will be a function of the nominal stepped voltage, but the slope of the function 40 will be lower than that of the linearly increasing stepped scheme. Similarly, the present invention may have an exponentially increasing surface area such as 1, 10, 100, 1,000 etc., if a base-10 exponential scale is used, such that a capacitance increase will be a function of the nominal stepped voltage increase across stepped capacitor 14, but the slope of the function 42 will also be lower than that of the linearly increasing stepped scheme.

Figure 6:
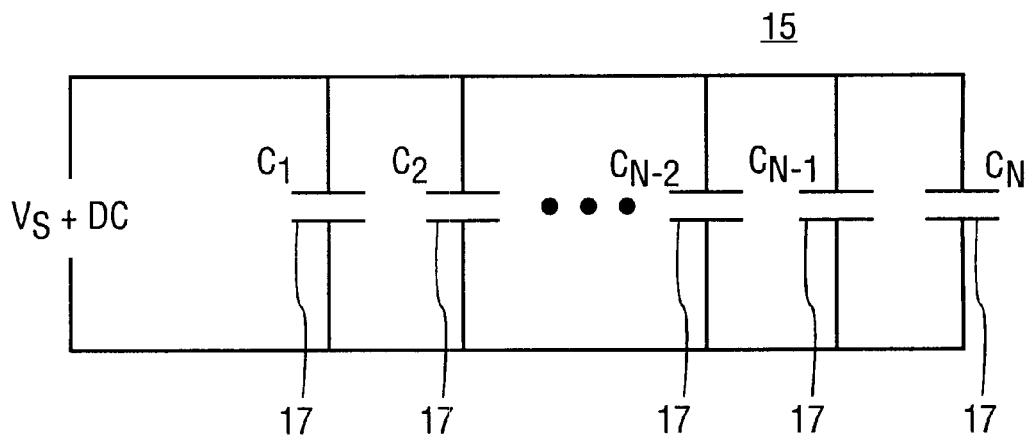
FIG. 6 is a schematic view of a stepped and variable MEMS capacitor according to one embodiment of the present invention.

FIG. 6 illustrates another embodiment of what may be used in place of capacitor 12 as it appears in circuit 10 of FIG. 1. A stepped capacitor 15 is depicted that includes a plurality of capacitors 17 arrayed in parallel in a first circuit 19. In this embodiment capacitors 17 are a combination of a varactor and a switch. In this embodiment, signal VS and DC actuation voltage are applied together. Capacitors $C_1$ through $C_n$ may be of different surface area sizes such that each will collapse at a different DC voltage. Thus, by stepping the DC voltage, a stepped total capacitance may be achieved. Accordingly, stepped increasing surface areas may be implemented as set forth herein. Specifically, linearly, geometrically, exponentially, and combination of stepped increasing surface areas may be implemented in order to achieve both digital and virtual analog varactor effects.

Figure 7:
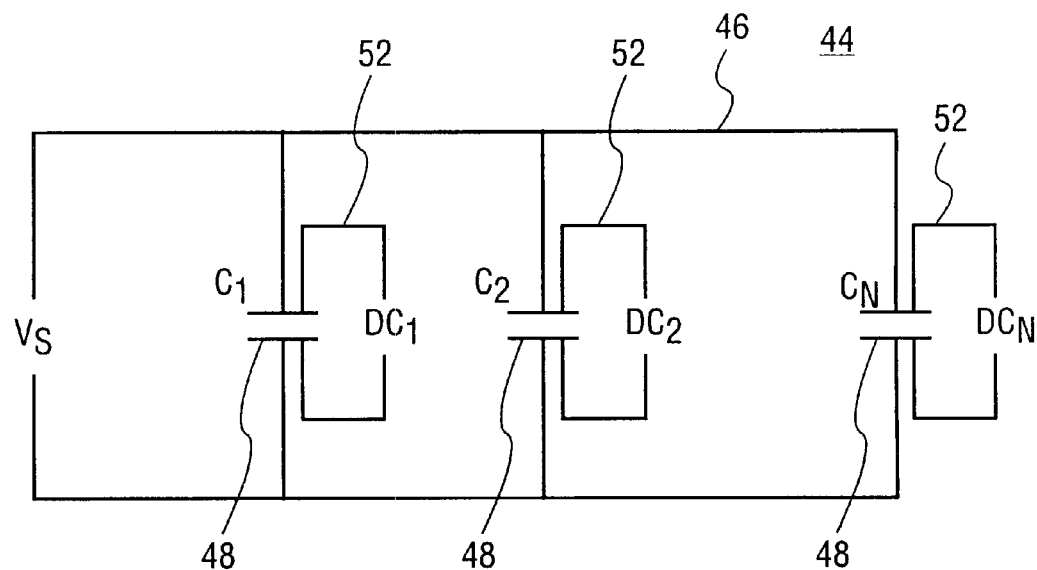
FIG. 7 is a schematic view of a stepped and variable MEMS capacitor according to one embodiment of the present invention.

Further definition of capacitance according to any one of the above three schemes may be accomplished by the independent tuning of any or all of the capacitors as set forth herein. FIG. 7 is another embodiment of the present invention. A variable stepped capacitor 44 is provided with a capacitor first circuit 46, wherein individual capacitors 48 are combined with a plurality of MEMS switches according to the first capacitor type set forth herein in order to achieve a preferred capacitance. In this embodiment, at least one of the plurality of individual capacitors 48 has a movable charge plate. Each capacitor 48 is depicted as having a capacitor tuning circuit 52, but it is understood that between one and all of individual capacitors 48 may be variable with a capacitor tuning circuit 52. In this embodiment, the increasing capacitance scheme is controlled by a plurality of DC voltages: $DC_1$ through $DC_n$. Again the specific surface areas of the capacitors $C_1$ through $C_n$ may have any of the linear, geometric, or exponential voltage closure threshold response characteristics as set forth herein. In one embodiment, it is individual capacitors 48 that are varied by one of linear, geometric, and exponential area differences.

Additionally, where the varying sizes may be considered to be analogous to integer changes in capacitance, the use of varying the circuits such as capacitor tuning circuit 52 may be considered to be analogous to intermediate or fractional changes that further define over the integer increases.

In a first example, a variable stepped capacitor 44 includes four nominal first capacitors and an nth capacitor that has a surface area that is five times those of each of the four nominal first capacitors. By combination of the nominal first capacitors and the nth capacitor, capacitances of integer amounts ranging from 1 to 9 may be achieved. Further intermediate definition of capacitance is attainable as set forth herein by varying any or each of the nominal first capacitors and the nth capacitor by use of a capacitor tuning circuit 52 for each capacitor that may be required to vary the overall stepped capacitance.

Figure 8:
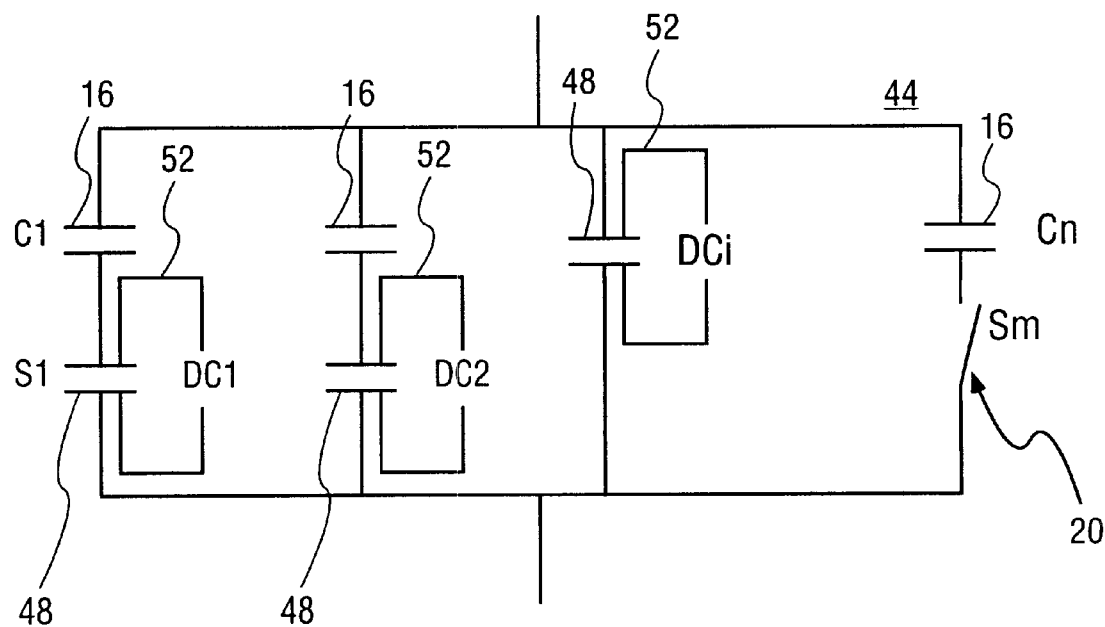
FIG. 8 is a schematic view of a stepped and variable MEMS capacitor according to one embodiment of the present invention.

In a second example, an additional capacitor having a surface area of 10 times those of each of the nominal first capacitors is provided in addition to the 5-times capacitor, to achieve capacitances of integer amounts ranging from 1 to 19. Yet another capacitor may be provided with a surface area 20 times those of each of nominal first capacitors in addition to the 5- and 10-times capacitors, may achieve capacitances of integer amounts ranging from 1 39. As set forth herein, intermediate or fractional changes may be achieved by varying any or all of the capacitors by independent tuning circuits 52. Other non-integer linear schemes may be established within the spirit and scope of the invention.

Where greater control of capacitance may be desired, each MEMS switch 48 may have its own switch circuit 52 such as a tuning circuit. FIG. 8 illustrates this embodiment that includes a more general case. In this embodiment, the surface areas of each MEMS switch 48 may be substantially equal to each other, and the closure of any or all of them is accomplished by instructing the independent switch circuits 52 to impress a sufficient voltage to close them. As set forth herein, the surface areas of the variable individual capacitors 16 and 48 may vary linearly, geometrically, or exponentially. Additionally, the capacitor tuning circuits 52 may be used for intermediate steps to achieve fractional changes in capacitance.

Figure 9:
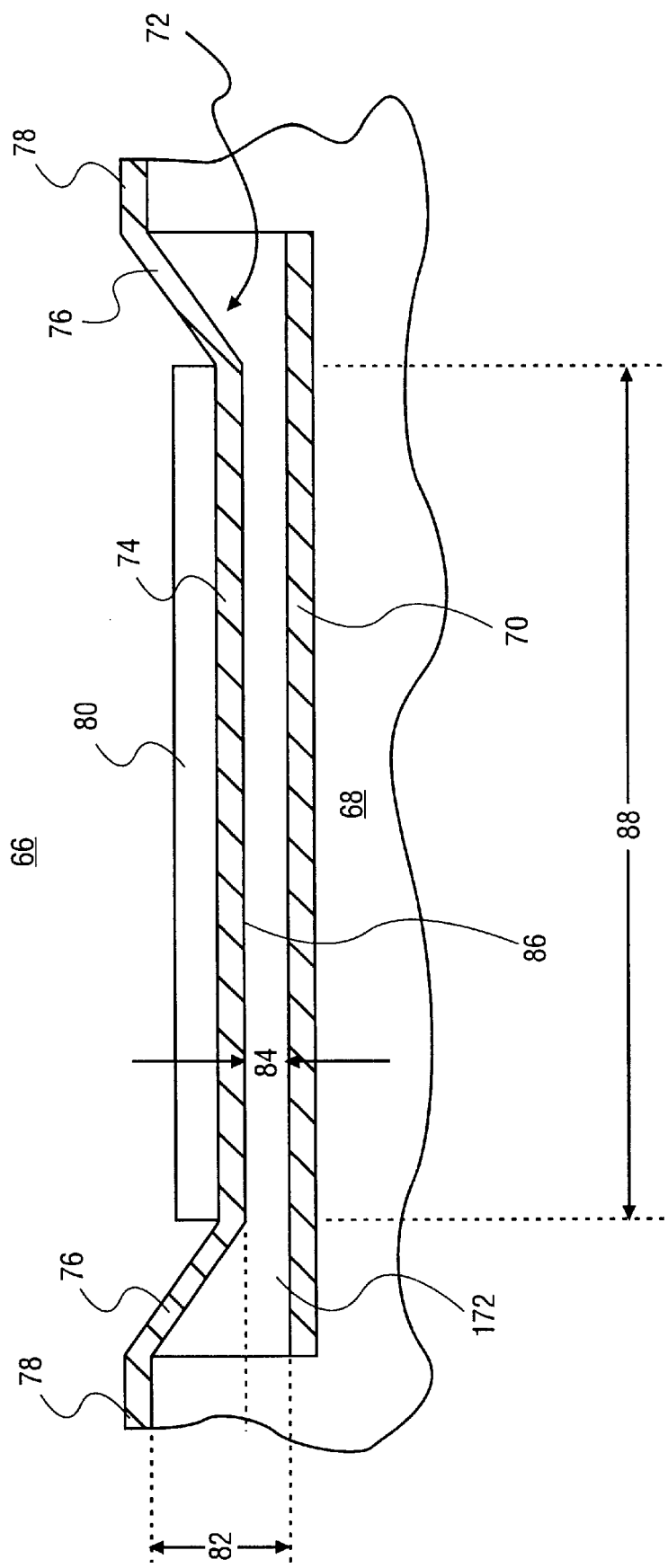
FIG. 9 is an elevational cross-section view of a variable capacitor according to the present invention.

According to the present invention, various types of MEMS capacitors may be used to accomplish a desired capacitance. FIG. 9 is an elevational cross-section view of the inventive variable capacitor that is designated by the reference numeral 66. FIG. 9 illustrates a substrate 68 in which a fixed charge plate 70 is disposed. A movable charge plate 72 is disposed above fixed charge plate 70. Movable charge plate 72 may be characterized by a planar portion 74, a suspension portion 76, and a terminal portion 78. Affixed to planar portion 74 of movable charge plate 72 is a stiffener 80. Stiffener 80 may occupy the same footprint as planar portion 74 of movable charge plate 72.

A first separation distance 82 is observed as the original separation distance between fixed charge plate 70 and planar portion 74 before an actuation force is applied. Similarly, a second separation distance 84 is observed between planar portion 74 and fixed charge plate 70 as the tunable capacitor separation distance at a given applied actuation force.

Stiffener 80 may be made of any material that causes planar portion 74 of movable charge plate 72 to resist bending. Preferably, stiffener 80 is made of silicon nitride, $Si_xN_y$, where x and y have values that make up both stoichiometric and solid solution combinations. Stiffener 80 may also be made of oxides such as silica, titania, alumina, ceria, thoria, and other oxides that make up both stoichiometric and solid solution combinations. Additionally, stiffener 80 may be made of any material, preferably dielectric, that allows the inventive structure to achieve a tunable range greater than about 30%, preferably greater than about 50%, and more preferably greater than about 100%.

Figure 10:
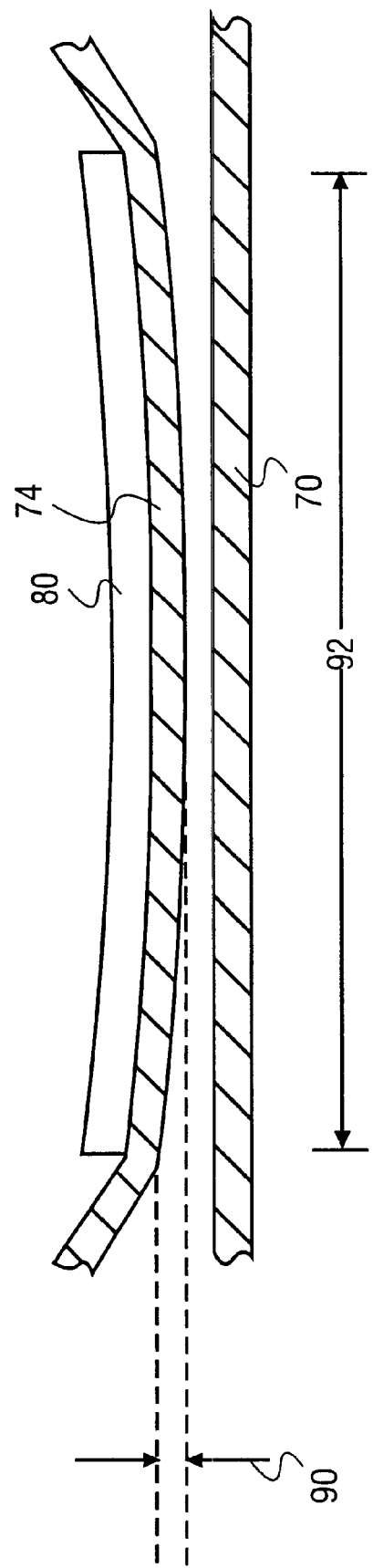
FIG. 10 is an exaggerated elevational cross-section view of the variable capacitor to illustrate relative warping of a MEMS device.

Second separation distance 84 is observed to be substantially constant. By "substantially constant," it is meant that warping of planar portion 74 of movable charge plate 72 is minimized. Relative warping is defined as a relative measure of deflection of any point along the charge surface 86 of planar portion 74 in vertical relation to any other point thereon, divided by the length 88 of planar portion 74. FIG. 10 is an exaggerated detail illustration of relative warping wherein the deflection difference 90, can be relatively quantified by dividing by the length 92. Relative warping in the present invention may be in a range from about 30% to about 0.1%, preferably from about 10% to about 0.5% and most preferably from about 2% to about 1%.

Referring again to FIG. 9, first separation distance 82 is the measurement from terminal portion 78 of movable charge plate 72 to down to fixed charge plate 70. Suspension portion 76 of movable charge plate 72 is separated from fixed charge plate 70 over a variable distance that is at a maximum at first separation distance 82 and at a minimum at second separation distance 84. Consequently, removing material in this portion preferably reduces capacitance for suspension portion 76.

Figure 11:
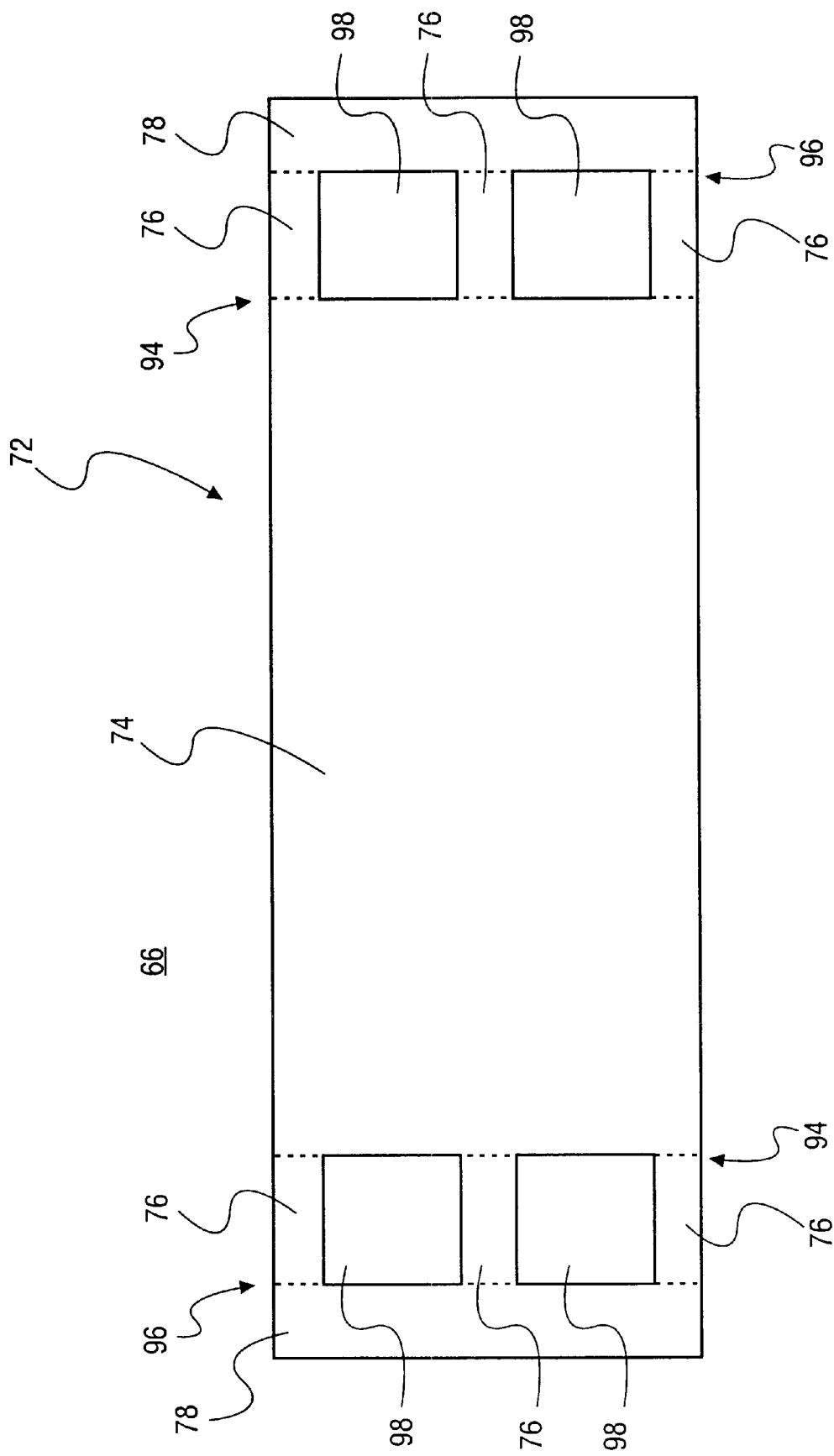
FIG. 11 is a top cut-away view of the variable capacitor depicted in FIG. 9.

FIG. 11 is a top view of variable capacitor 66 that further illustrates the present invention. Stiffener 80 has been removed to further illustrate movable charge plate 72. Movable charge plate 72 is seen as comprising planar portion 74 and suspension portion 76 that meet an angle at a bend depicted by the dashed line 94, and terminal portion 78. Terminal portion 78 and suspension portion 76 also meet at an angle at a bend depicted by the dashed line 96.

FIG. 11 illustrates that suspension portion 76 may contain through holes 98 to form a broken surface suspension of planar portion 74. The broken surface of suspension portion 76 of movable charge plate 72 reduces capacitance surface area for that section of movable charge plate 72 by reducing the amount of charge surface area that is present at the variable first separation distance 82. Thereby the broken surface of suspension portion 76 allows for better control of the variable capacitor quality of the present invention. Additionally, because there is less material that must bend in suspension portion 76 when it has a broken surface suspension, movable charge plate 72 is more pliable and therefore more easily tunable. It is understood that suspension portion 76 may also be solid. Where suspension portion 76 has a broken surface, fixed charge plate 70 has a first surface area and movable charge plate 72 has a second surface area that is smaller than the first surface area.

In a preferred embodiment, the capacitor according to the present invention has a movable charge plate that is divided into a solid surface charge plate portion and a broken surface suspension.

Figure 12:
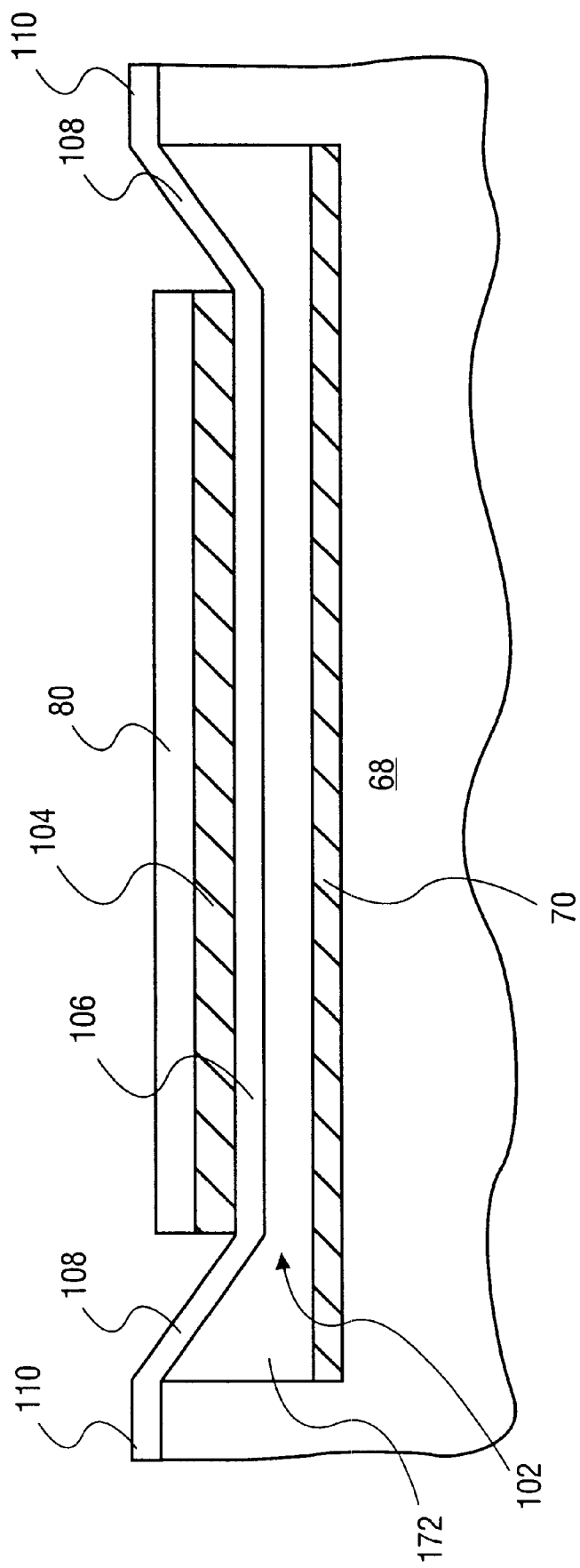
FIG. 12 is an elevational cross-section view of another embodiment of the variable capacitor.

FIG. 12 is an elevational cross-section view of another variable capacitor 100 that illustrates another embodiment of the present invention. FIG. 12 illustrates a flexible dielectric material 102 that has a movable charge plate 104 disposed thereon and that is suspended above a fixed charge plate 70. It is noted that movable charge plate 104 cannot make electrical contact with fixed charge plate 70 because flexible dielectric material 102 is interposed therebetween.

In this embodiment, flexible dielectric material 102 is divided into a planar subsection 106, a suspension subsection 108 and a terminal subsection 110. A stiffener 80 is disposed upon flexible dielectric material 102. Stiffener 80 has a footprint that may be substantially the same as movable charge plate 104 as well as planar subsection 106. Movable charge plate 104 is interposed between stiffener 80 and planar subsection 106. Although stiffener 80 is illustrated as entirely cloaking movable charge plate 104 from a top-down view in FIG. 12, it is understood that stiffener 80 may have a footprint that is larger, the same as, or smaller than movable charge plate 104. Where stiffener 80 is larger than movable charge plate 104, it may be larger by a factor range from about 1.01 to about 2, preferably from about 1.1 to about 1.5.

In the process of forming at least one through hole 98 (not pictured in FIG. 12) in the flexible dielectric material 102 below the movable charge plate, at least one through hole 98 has an area, relative to the total area of flexible dielectric material 102, in a range from about 1% to about 50%, preferably from about 10% to about 40%.

FIG. 13 is another embodiment of the present invention. In this embodiment, a stiffener 80 is superimposed over a movable charge plate 112 (not visible). In this embodiment, stiffener 80 obscures the planar portion 114 of movable charge plate 112. In this embodiment, the suspension portion 116 of movable charge plate 112 forms a spring in the shape of an undulating suspension between planar portion 114 and the terminal portion 118 of movable charge plate 114. By this embodiment, greater flexibility may be achieved for the actuation of planar portion 114 of movable charge plate 112.

Figure 15:
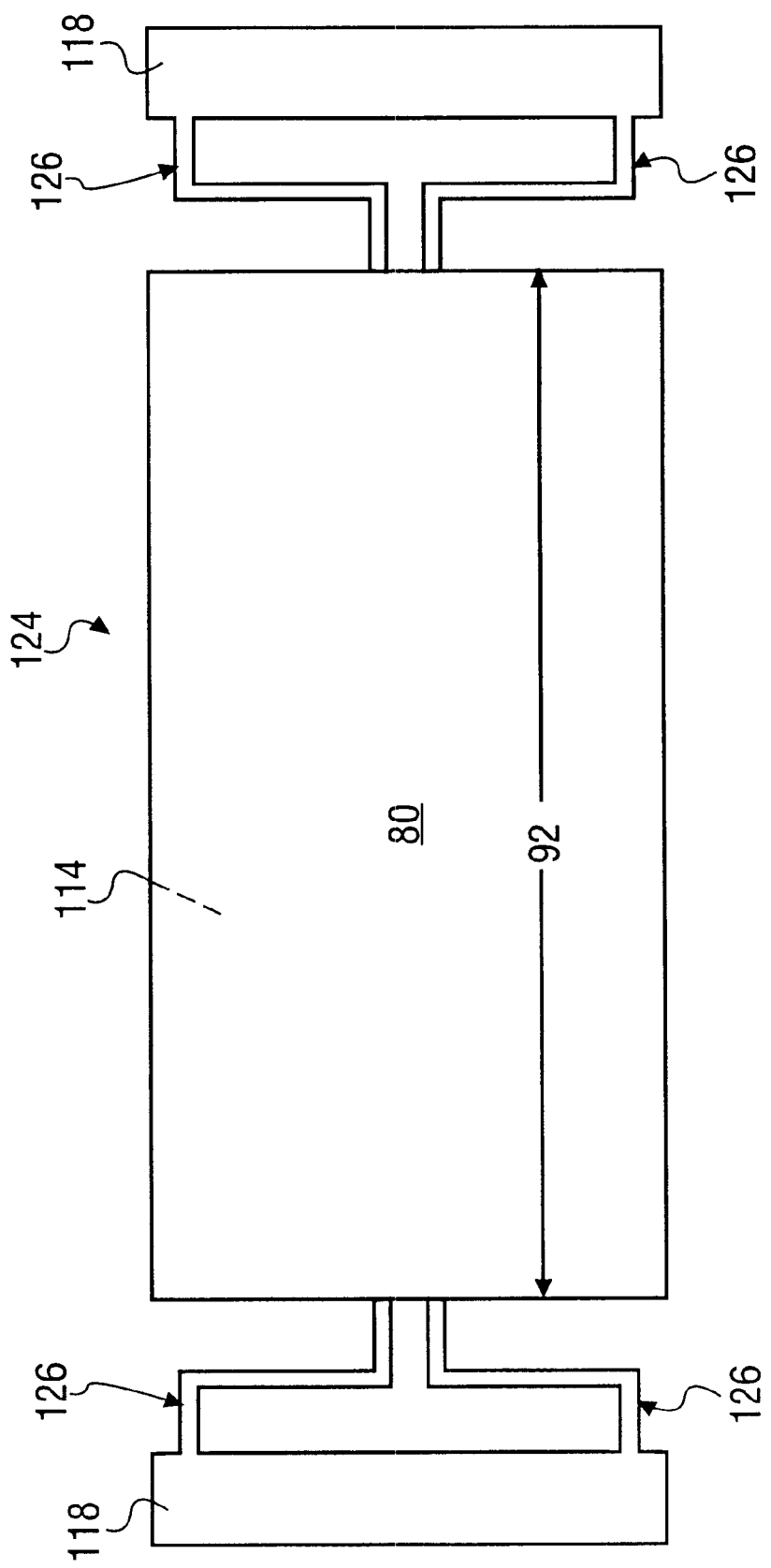
FIG. 15 is a top view of an alternative embodiment of the variable capacitor depicted in FIG. 9.

FIG. 13 illustrates suspension portion 116 with "W" and "M" shapes. Although these shapes are one preferred embodiment, simpler or more complex shapes may be achieved. One example of a simpler shape is illustrated in FIG. 14. In FIG. 14, a movable charge plate 120 with a suspension portion 122 with both "U" shaped and an inverted "U" shaped undulating connections between planar portion 114 and the terminal portion 118 of movable charge plate 120. Another example of a simpler shape is illustrated in FIG. 15. In FIG. 15, a movable charge plate 124 includes a suspension portion 126 that has both "S" and mirror-image "S" shapes that undulate between planar portion 114 and the terminal portion 118 of movable charge plate 124.

Although the undulating suspensions 116, 122, and 126, respectively depicted in FIGS. 13, 14, and 15 are presented as portions of movable charge plates 112, 120, and 124, respectively, it is understood that the undulating suspensions 116, 122, and 126, may also be integral portions of flexible dielectric materials. The integral portions of flexible dielectric materials may be for structures depicted in FIG. 12.

In an alternative embodiment, the undulating configuration that constitutes the suspension portion of the flexible dielectric, may be a continuous undulating structure that extends across the planar portion of the movable charge plate to create a multiple channel open configuration. Accordingly, where FIG. 12 may illustrate a continuous undulating structure, it may begin at one terminal portion 110, continue as one suspension portion 108, continue as planar portion 106, and finish as the other suspension portion 108 and terminal portion 110, respectively.

Different degrees of flexibility are achieved by the particular material used, whether charge plate material or flexible dielectric material, and by the dimensions of the undulating structures. For example, suspension portion 116 of movable charge plate 112 has a thickness 128 and amplitude 130 that may be related to the length 92 and/or the width 132 of movable charge plate 112. Similarly, the suspension portion 122 of movable charge plate 120 has a thickness 128 and amplitude 130 that may be related to the length 92 and/or the width 132 of movable charge plate 120.

FIG. 16 illustrates another embodiment of the present invention in which the functions of capacitance and electrostatic actuation are separated. A variable capacitor 134 includes a planar portion 136 and a stiffener 80. Suspension portions, etc. are not illustrated but may include any embodiment set forth herein. Fixed charge plates 138 may be elevated upon the substrate 140 above an actuator plate 142. Actuator plate 142 is disposed upon a lower substrate 144. The elevation of fixed charge plates 138 may be negligible or omitted to achieve a structure where fixed charge plates 138 and fixed actuator plate 142 are at substantially the same level. For this alternative embodiment, substrates 140 and 144 may be the same level and fashioned from the same material layer in a single process step.

The planar portion 136 of the movable charge plate is affixed to a stiffener 80. Together, planar portion 136 and stiffener 80 are actuated by actuator plate 142 to establish a preferred separation distance 146 for a desired capacitance. Actuator plate 142 uses electromotive force to reposition planar portion 136 of the movable charge plate to a desired separation distance 146.

FIG. 17 illustrates another embodiment of the present invention similar to the embodiment depicted in FIG. 16. A variable capacitor 148 has the addition that there is a plurality of movable charge plates 150 that are isolated from a movable actuator plate 152. According to this embodiment, the establishment of a preferred capacitance may be carried out where the electromotive force applied between the fixed actuator plate 142 and the movable actuator plate 152. This actuation scheme has a diminished effect, if any, upon the capacitance that is established between the fixed charge plate 138 and movable charge plates 150. Accordingly, the desired capacitance established may be more directly related to the separation distance 146.

Figure 18:
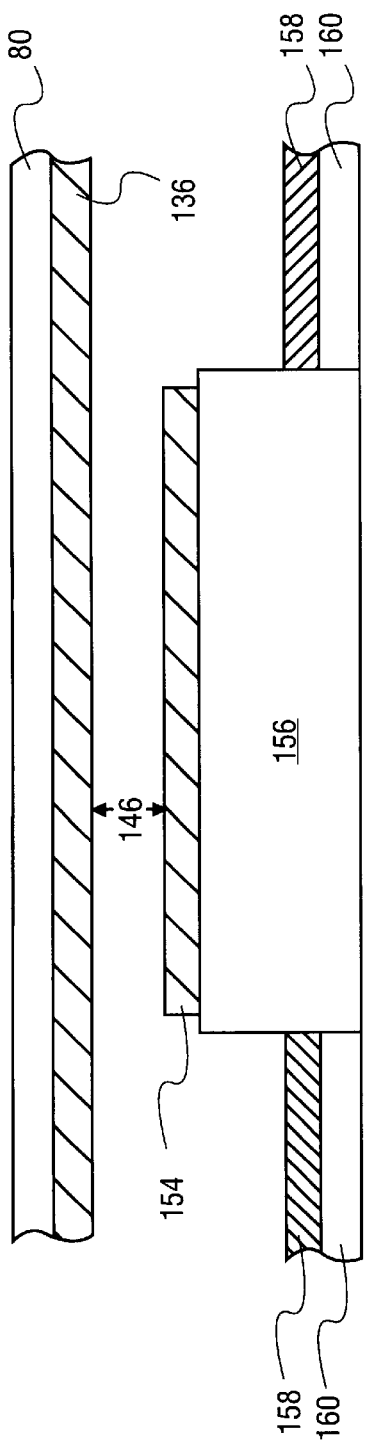
FIG. 18 is an elevational cross-section view of another embodiment of the variable capacitor.

FIG. 18 illustrates yet another embodiment of the present invention in which the functions of capacitance and electrostatic actuation are separated. A fixed charge plate 154 may be elevated upon the substrate 156 above an actuator plate 158. Actuator plate 158 is disposed upon a lower substrate 160. The elevation of fixed charge plate 154 may be negligible or omitted to achieve a structure where fixed charge plate 154 and fixed actuator plate 158 are at substantially the same level. For this alternative embodiment, substrates 156 and 160 may be the same level and fashioned from the same material layer in a single process.

The planar portion 136 of the movable charge plate is affixed to a stiffener 80. Together, planar portion 136 and stiffener 80 are actuated by actuator plate 158 to establish a preferred separation distance 146 for a desired capacitance. Actuator plate 158 uses electromotive force to reposition planar portion 136 of the movable charge plate to a desired separation distance 146.

Figure 19:
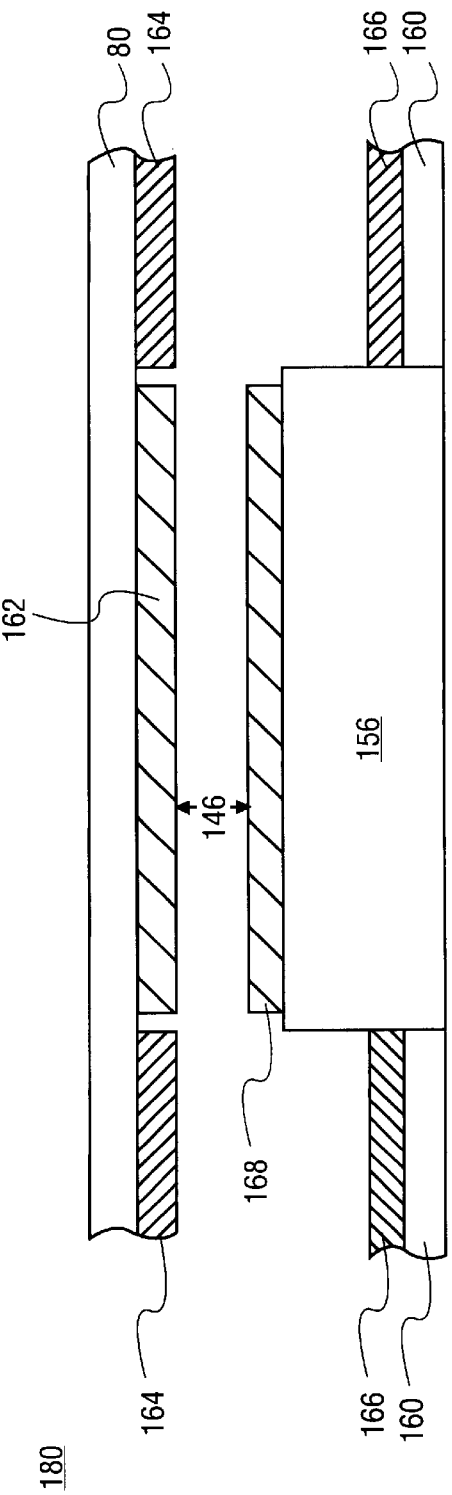
FIG. 19 is an elevational cross-section view of an alternative embodiment of the variable capacitor depicted in FIG. 18.

FIG. 19 illustrates another embodiment of the present invention similar to the embodiment depicted in FIG. 18, with the addition that the movable charge plate 162 is isolated from movable actuator plates 164. According to this embodiment, the establishment of a preferred capacitance may be carried out where the electromotive force applied between the fixed actuator plate 166 and the movable actuator plate 164. This actuation scheme has a diminished effect, if any, upon the capacitance that is established between the fixed charge plate 168 and movable charge plate 162. Accordingly, the desired capacitance established may be more directly related to the separation distance 146.

In the embodiments set forth in FIGS. 16, 17, 18, and 19, it is understood that suspension of the movable charge plate may be carried out by the suspension portion embodiments as set forth in this disclosure including the interposition of a flexible and/or dielectric structure Additionally, other suspension schemes may be used for this embodiment of the invention.

In the forgoing embodiments, the suspension sections 76, 108, 116, 122, and 126 are examples of a means for suspending the movable charge plate. In the forgoing embodiments, the fixed charge plates 70 and 138 are examples of a means for moving the movable charge plate.

Figure 20:
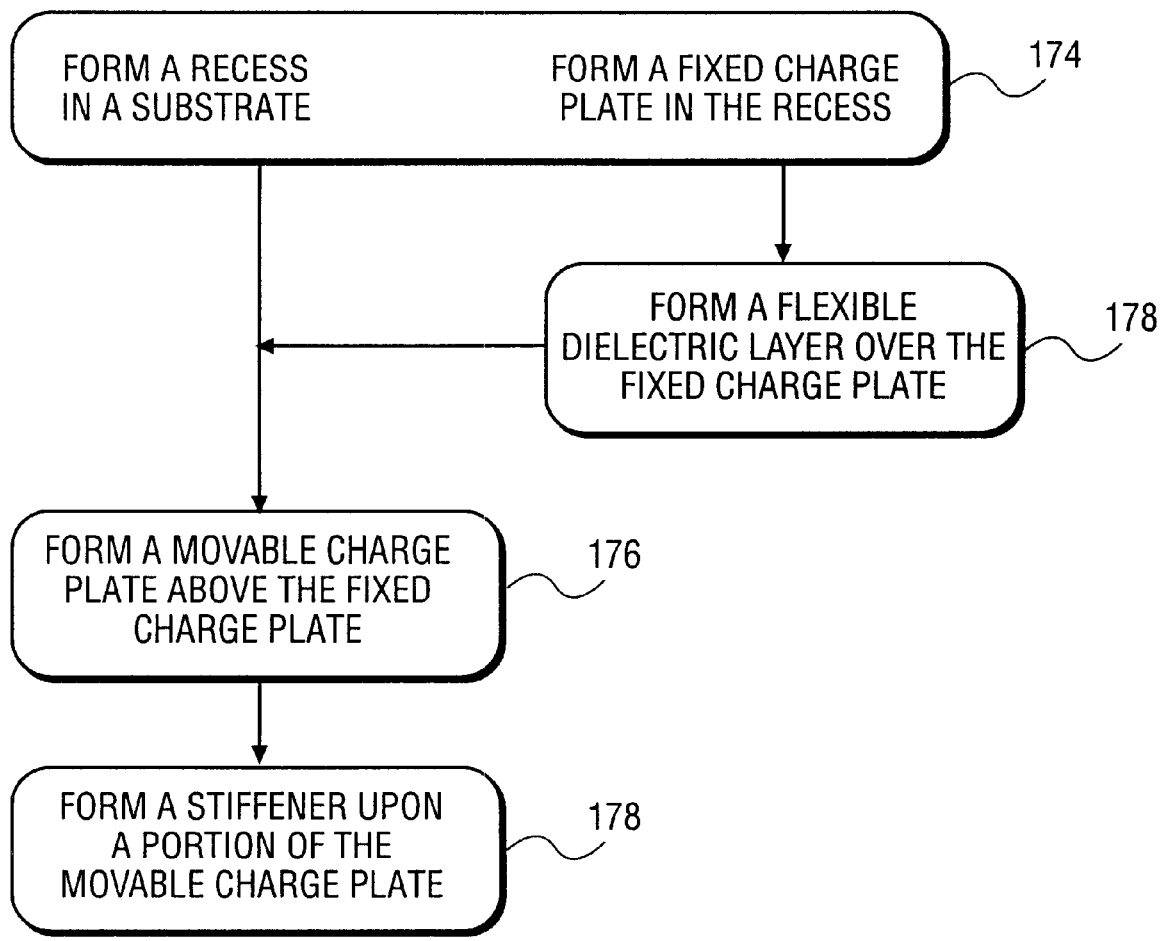
FIG. 20 is a process flow diagram that illustrates the inventive method.

The variable capacitor is made according to an inventive method 170 that is illustrated in FIG. 20. A recess 172 is formed in substrate 68 as depicted in FIG. 9. Recess 172 may be formed of a single etch, or it may be part of a damascene structure. Fixed charge plate 70 is formed in recess 172 by deposition such as chemical vapor deposition (CVD) or physical vapor deposition (PVD). The method illustrated in FIG. 20 demonstrates that formation of the recess and the fixed charge plate may be contemporaneous as depicted in flow block 174. Movable charge plate 72 is formed above fixed charge plate 70 as depicted in process flow block 176. Movable charge plate 72 is formed by a method such as filling recess 172 with a temporary material, depositing movable charge plate 72, and wet etching the temporary filler material that filled recess 172. Stiffener 80 is formed upon a portion of movable charge plate 72 as depicted in flow block 178. Where patterning of at least a portion of movable charge plate 72 precedes removal of filler material in recess 172, patterning of multiple through-holes or any one of the undulating suspension sections as disclosed herein, will facilitate removal of the filler material. According to the inventive method, a flexible dielectric material 102 may be formed 178 over the fixed charge plate.

The variable capacitor 100 illustrated in FIG. 12 is formed in a manner similar to variable capacitor 66. Prior to formation of movable charge plate 104, flexible dielectric layer 102 is formed upon a filler material that is to be removed to form recess 172 as depicted in process flow block 176. After flexible dielectric layer 102 is formed, patterning may precede or follow removal of the filler material disposed in recess 172. Where patterning of flexible dielectric layer 102 precedes removal of the filler material in recess 172, patterning of any one of the undulating suspension sections as disclosed herein, will facilitate removal of the filler material.

The variable capacitor 134 depicted in FIG. 16 is formed by forming lower substrate 144 in recess 172 and forming fixed actuator plate 142 upon lower substrate 144. Elevated substrate 140 is formed either by depositing or etching into a portion of recess 172. Fixed charge plate 138 is formed upon elevated substrate 140 and a filler material to be removed fills recess 172 during the formation of flexible dielectric layer (not pictured) according to embodiments set forth herein. Where fixed charge plate 138 and fixed actuator plate 142 are at the same height, they may be patterned from the same metal layer. Variable capacitor 148 is formed by a similar method with the added limitation that movable charge plates 150 are patterned to form movable actuator plate 152.

The variable capacitor 178 depicted in FIG. 18 is formed by forming lower substrate 160 in recess 172 and forming fixed actuator plate 158 upon lower substrate 160. Elevated substrate 156 is formed either by depositing or etching into a portion of recess 172. Fixed charge plate 154 is formed upon elevated substrate 156 and a filler material to be removed fills recess 172 during the formation of flexible dielectric layer (not pictured) according to embodiments set forth herein. Where fixed charge plate 154 and fixed actuator plate 158 are at the same height, they may be patterned from the same metal layer. Variable capacitor 180 is formed by a similar method with the added limitation that movable charge plate 162 is patterned to form movable actuator plate 164.

Distinct advantages exist for the present invention. One advantage is that a tunable range is achieved that was not achievable in the prior art. Because of the presence of a stiffener as disclosed herein, the critical gap between the movable charge plate and the fixed charge plate can be smaller than what was allowable in the prior art. Consequently, the tunable range of the variable capacitor may be more than 100%. As applied to wireless technology, by way of non-limiting example, the variable capacitor of the present invention may enable a wireless device to operate at multiple bands such as 900 MHz, 1.9 GHz, and 2.4 GHz. Thus, transceiver design may be changed to enable the same variable capacitor to be used for the various frequencies.

Another advantage is that the establishment and control over a preferred capacitance is more predictable and therefore more reliable. The presence of the stiffener and the broken surface suspension significantly reduces the capacitance that does not change near the terminal ends of variable capacitors of the prior art. Further, the separation of actuation and capacitance as disclosed herein allows for greater control.

In addition to undulating suspensions for variable capacitors, undulating suspensions for MEMS switches may also be employed as set forth herein.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A micro electromechanical (MEMS) capacitor comprising:
   a plurality of MEMS capacitors arrayed in parallel in a circuit;
   a first switch that is in series with a first MEMS capacitor, wherein the first switch has a first voltage closure threshold; and
   a second switch that is in series with a second MEMS capacitor, wherein the second switch has a second voltage closure threshold that is higher than the first voltage closure threshold.

2. The MEMS capacitor according to claim 1, wherein the at least one switch comprise at least one MEMS switch.

3. The MEMS capacitor according to claim 1, wherein the at least one switch comprise at least one parallel plate switch.

4. The MEMS capacitor according to claim 1, wherein at least one of the plurality of capacitors has a movable charge plate.

5. The MEMS capacitor according to claim 1, wherein at least one of the plurality of capacitors has a movable charge plate, wherein the plurality of capacitors is configured to achieve a plurality of linearly stepped capacitances.

6. The MEMS capacitor according to claim 1, wherein at least one of the plurality of capacitors has a movable charge plate, wherein the plurality of capacitors is configured to achieve a plurality of linearly stepped capacitances, and wherein the at least one of the plurality of capacitors having a movable charge plate is configured to achieve a plurality of intermediate stepped capacitances.

7. The MEMS capacitor according to claim 1, wherein at least one of the plurality of capacitors has a movable charge plate, wherein the plurality of capacitors is configured to achieve a plurality of geometrically stepped capacitances.

8. The MEMS capacitor according to claim 1, wherein at least one of the plurality of capacitors has a movable charge plate, wherein the plurality of capacitors is configured to achieve a plurality of geometrically stepped capacitances, and wherein the at least one of the plurality of capacitors having a movable charge plate is configured to achieve a plurality of intermediate stepped capacitances.

9. The MEMS capacitor according to claim 1, wherein at least one of the plurality of capacitors has a movable charge plate, wherein the plurality of capacitors is configured to achieve a plurality of exponentially stepped capacitances.

10. The MEMS capacitor according to claim 1, wherein at least one of the plurality of capacitors has a movable charge plate, wherein the plurality of capacitors is configured to achieve a plurality of exponentially stepped capacitances, and wherein the at least one of the plurality of capacitors having a movable charge plate is configured to achieve a plurality of intermediate stepped capacitances.

11. A micro electromechanical (MEMS) capacitor comprising:
   a plurality of MEMS capacitors arrayed in parallel in a first circuit; and
   at least one switch aligned in series with at least one of the plurality of MEMS capacitors in the first circuit, wherein each of the at least one switch is actuated from a second circuit to establish a capacitance value of the first circuit.

12. The MEMS capacitor according to claim 11, wherein the at least one switch comprise at least one MEMS switch.

13. The MEMS capacitor according to claim 11, wherein the at least one switch comprise at least one parallel plate switch.

14. The MEMS capacitor according to claim 11, wherein the at least one switch further comprises:
   a first switch that is in series with a first MEMS capacitor, wherein the first switch has a first voltage closure threshold; and
   a second switch that is in series with a second MEMS capacitor, wherein the second switch has a second voltage closure threshold that is higher that the first voltage closure threshold.

15. The MEMS capacitor according to claim 11, wherein at least one of the plurality of capacitors has a movable charge plate.

16. The MEMS capacitor according to claim 11, wherein at least one of the plurality of capacitors has a movable charge plate, wherein the plurality of capacitors is configured to achieve a plurality of linearly stepped capacitances.

17. The MEMS capacitor according to claim 11, wherein at least one of the plurality of capacitors has a movable charge plate, wherein the plurality of capacitors is configured to achieve a plurality of linearly stepped capacitances, and wherein the at least one of the plurality of capacitors having a movable charge plate is configured to achieve a plurality of intermediate stepped capacitances.

18. The MEMS capacitor according to claim 11, wherein at least one of the plurality of capacitors has a movable charge plate, wherein the plurality of capacitors is configured to achieve a plurality of geometrically stepped capacitances.

19. The MEMS capacitor according to claim 11, wherein at least one of the plurality of capacitors has a movable charge plate, wherein the plurality of capacitors is configured to achieve a plurality of geometrically stepped capacitances, and wherein the at least one of the plurality of capacitors having a movable charge plate is configured to achieve a plurality of intermediate stepped capacitances.

20. The MEMS capacitor according to claim 11, wherein at least one of the plurality of capacitors has a movable charge plate, wherein the plurality of capacitors is configured to achieve a plurality of exponentially stepped capacitances.

21. The MEMS capacitor according to claim 11, wherein at least one of the plurality of capacitors has a movable charge plate, wherein the plurality of capacitors is configured to achieve a plurality of exponentially stepped capacitances, and wherein the at least one of the plurality of capacitors having a movable charge plate is configured to achieve a plurality of intermediate stepped capacitances.

22. A micro electromechanical (MEMS) capacitor comprising:
   a plurality of MEMS capacitors arrayed in parallel in a first circuit; and
   at least one switch aligned in series with at least one of the plurality of MEMS capacitors in the first circuit, wherein each of the at least one switch is actuated from a respective independent circuit to establish a capacitance value of the first circuit.

23. The MEMS capacitor according to claim 22, wherein the at least one switch comprise at least one MEMS switch.

24. The MEMS capacitor according to claim 22, wherein the at least one switch comprise at least one parallel plate switch.

25. The MEMS capacitor according to claim 22, wherein the at least one switch further comprises:
   at least two switches in an independent circuit comprising at least a first switch and a second switch, wherein the first switch has a first voltage closure threshold and the second switch has a second voltage closure threshold that is higher that the first voltage closure threshold.

26. The MEMS capacitor according to claim 22, wherein at least one of the plurality of capacitors has a movable charge plate.

27. The MEMS capacitors according to claim 22, wherein at least one of the plurality of capacitors has a movable charge plate, wherein the plurality of capacitors is configured to achieve a plurality of linearly stepped capacitances.

28. The according to claim 22, wherein at least one of the plurality of capacitors has a movable charge plate, wherein the plurality of capacitors is configured to achieve a plurality of linearly stepped capacitances, and wherein the at least one of the plurality of capacitors having a movable charge plate is configured to achieve a plurality of intermediate stepped capacitances.

29. The MEMS capacitor according to claim 22, wherein at least one of the plurality of capacitors has a movable charge plate, wherein the plurality of capacitors is configured to achieve a plurality of geometrically stepped capacitances.

30. The MEMS capacitor according to claim 22, wherein at least one of the plurality of capacitors has a movable charge plate, wherein the plurality of capacitors is configured to achieve a plurality of geometrically stepped capacitances, and wherein the at least one of the plurality of capacitors having a movable charge plate is configured to achieve a plurality of intermediate stepped capacitances.

31. The MEMS capacitor according to claim 22, wherein at least one of the plurality of capacitors has a movable charge plate, wherein the plurality of capacitors is configured to achieve a plurality of exponentially stepped capacitances.

32. The MEMS capacitor according to claim 22, wherein at least one of the plurality of capacitors has a movable charge plate, wherein the plurality of capacitors is configured to achieve a plurality of exponentially stepped capacitances, and wherein the at least one of the plurality of capacitors having a movable charge plate is configured to achieve a plurality of intermediate stepped capacitances.

\* \* \* \* \*

UNITED STATES PATENT AND TRADEMARK OFFICE
CERTIFICATE OF CORRECTION

PATENT NO. : 6,593,672 B2  Page 1 of 1
DATED : July 15, 2003
INVENTOR(S) : Ma et al.

It is certified that error appears in the above-identified patent and that said Letters Patent is hereby corrected as shown below:

Column 4,
Line 18, delete "VS", insert -- $V_s$ --.

Signed and Sealed this

Twenty-fifth Day of November, 2003

JAMES E. ROGAN
*Director of the United States Patent and Trademark Office*